United States Patent [19]

Rowland et al.

[11] Patent Number: 5,526,457
[45] Date of Patent: Jun. 11, 1996

[54] METHOD AND APPARATUS FOR PREVENTING DRY BAND ARCING IN A COMBINED OVERHEAD ELECTRICAL POWER AND OPTICAL TRANSMISSION SYSTEM

[75] Inventors: Simon M. Rowland, Tarporley; Ian Nichols, Liverpool, both of England

[73] Assignee: BICC Public Limited Company, London, England

[21] Appl. No.: 354,089

[22] Filed: Dec. 6, 1994

[30] Foreign Application Priority Data

Oct. 28, 1994 [GB] United Kingdom ............... 9421724

[51] Int. Cl.$^6$ .......................................... G02B 6/44
[52] U.S. Cl. ......................................... 385/101; 174/70 R
[58] Field of Search ........................ 385/100–102, 385/105, 106, 147; 174/68.1, 70 R

[56] References Cited

U.S. PATENT DOCUMENTS

| 4,673,247 | 6/1987 | Oestreich | 385/102 |
| 4,776,665 | 10/1988 | Oestreich | 385/102 |

FOREIGN PATENT DOCUMENTS

| 403285 | 11/1985 | European Pat. Off. . |
| 214480 | 8/1986 | European Pat. Off. . |
| 303740 | 12/1989 | European Pat. Off. . |
| 2267182 | 7/1993 | United Kingdom . |
| WO94/24596 | 4/1994 | WIPO . |

OTHER PUBLICATIONS

"Mathematical model of dry-band arcing on self-supporting, all dielectric, optical cables strung on overhead power lines" by Carter et al, May 1992, IEE proceedings.

"Development of aerial fibre optic cables for operation on 400 kv power lines" by Peacock et al. IEE Proceedings vol–139, No. 6, Nov. 1992.

"Self-Supporting Dielectric fiber Optic Cables in High Voltage lines" by Oestreich et al., International Wire & Cable Symp. Proceedings 1988 (No month).

Patent Abstracts of Japan, vol. 009 No. 281 (P–403), 8 Nov. 1985 & JP–A–60 122908 (Mitsubishi Denki KK) 1 Jul. 1985.

*Primary Examiner*—Akm E. Ullah
*Attorney, Agent, or Firm*—Gary M. Nath; Anthony D. Miller; Nath & Associates

[57] ABSTRACT

An overhead electrical power and optical transmission system, comprising overhead electrical phase conductors (2) extending between and supported by towers (10), and at least one optical cable (1) that extends between and is supported by, the towers. Each optical cable has a resistive element (12) that is removably supported thereby and which extends from a tower (10) where it is earthed part of the way along the span of the optical cable, and the resistive element has the necessary length and conductivity such that if a dry band (6) occurs on the cable at the end of the element, the potential difference (VG') across the band is insufficient to form an arc, such that any induced current is insufficient to sustain any arc that may occur across the dry band.

11 Claims, 3 Drawing Sheets

1

METHOD AND APPARATUS FOR PREVENTING DRY BAND ARCING IN A COMBINED OVERHEAD ELECTRICAL POWER AND OPTICAL TRANSMISSION SYSTEM

BACKGROUND OF THE INVENTION

1. Field of the Invention

This invention relates to optical cables that are supported along the route of electrical power transmission system by means of towers, masts or other upstanding supports that are also employed to support electrical power cables.

2. Discussion of the Prior Art

In systems of this kind it is the general practice to earth the optical cable or cables at the towers, masts or other supports hereinafter simply referred to as towers. When the electrical power lines are under load, electrical currents may be capacitively induced on the optical cable due to the distributed capacitance between the cable and the power lines. The voltage induced on the optical cable will reach a maximum at mid-span between the towers, while the current flowing along the cable will be greatest in the region of the towers. Under dry conditions the induced currents will be relatively small due to the relatively high longitudinal resistance of the cable, e.g. in the region of $10^{12}$ ohm $m^{-1}$ but under wet conditions when the surface resistance of the cable is much lower, e.g. in the region of 10 Mohm $m^{-1}$, much higher currents will be induced. Joule heating of the cable surface by the induced currents can cause a short length of the cable surface to become dry, usually in the region of a tower where the current is highest. When this happens the major part of the induced voltage on the cable is dropped across the short dry band due to its high longitudinal resistance, and so called "dry-band arcing" may occur which can cause severe damage to the cable.

It is possible to overcome the problem of dry-band-arcing in an optical cable by providing the cable with a longitudinally extending electrically conductive path. However, an optical cable having such an electrically conductive path has the disadvantage that there are considerable safety issues to be taken into account if it is to be installed between towers of an overhead electric power transmissions line that is on load in view of the danger of it touching one of the transmission lines; moreover, it is not always possible or desirable to interrupt the electrical power transmitted by the overhead electric power transmission line for a time sufficient to enable such an optical cable to be installed.

It has been proposed, for example in European Patent Application No: 214,480, to employ a cable having a resistive element and a linear resistance of $10^7$ to $10^{12}$ ohm $m^{-1}$. However, such systems have the disadvantages (among others) that the electrical properties of the resistive element may vary with time due to aging, pollution, cable strain and the like and as a result lose its efficacy.

It has also been proposed, for example in European Patent Application No. 403,285 to include a resistive flitting on the optical cable adjacent to the tower in order to reduce arcing on the cable and joule heating. However, such fittings do not eliminate the occurrence of stable dry-band arcing.

SUMMARY OF THE INVENTION

According to the present invention, there is provided a combined overhead electrical power and optical transmission system which comprises overhead electrical phase conductors extending between and supported by, towers, and at least one optical cable that extends between, and is supported by, the towers, the or each optical cable having a resistive element that is removably supported thereby and which extends from a tower where it is earthed part of the way along the span of the optical cable, the resistive element having a length and conductivity such that if a dry-band occurs on the cable at the end of the element, the potential difference across the band is insufficient to form an arc, and/or such that the induced current is insufficient to sustain any arc that may occur across the dry band.

The system according to the invention has the advantage that it is possible for the phenomenon of stable dry-band arcing to be substantially eliminated. This is achieved partly by virtue of the fact that the element moves the point at which any dry band arc could be formed away from the tower to a position in which capacitively induced currents are relatively low. In addition, the voltage at the end of the resistive element can be raised (by capacitive coupling with the phase conductors and due to the induced currents flowing through it) sufficiently to prevent an arc being formed across any dry band that may occur, and the resistive element will act as a resistor between the arc and ground, and so limit the current of any arc to a value that cannot sustain the arc. In addition, the resistive element can be removed when necessary, for example when its electrical properties have altered due to aging and/or pollutants, and can be replaced. Preferably, the resistive element can be installed on the optical cable by locating one end thereof on the cable and sliding the element along the cable from the tower. Such an element and method of installation enables the operations on the element during its removal and replacement to be performed from the tower in relative safety even when the electric power lines are on load. Thus, for example, the element may be sufficiently flexible to be rolled up when being transported up the tower, but be sufficiently stiff that once its end, and any intermediate position thereon is slidably attached to the cable, it can simply be pushed along the cable to its full extent. As an example a rod of 2 to 10 mm diameter, preferably 4 to 6 mm diameter and especially 5 mm diameter (e.g. glass reinforced plastics) with a flexural modulus of 20 to 50 GPa, preferably 30 to 45 GPa and especially A40 GPa would be appropriate.

Preferably the resistive element has a sufficient length that, when a dry band is formed on the cable at the end of the element, the voltage at the end of the element is raised (by virtue of capacitive coupling of the element to the phase conductors and by virtue of the current flowing through the element) sufficiently to prevent formation of a stable arc across the dry band. Thus, by appropriate choice of conductivity of the resistive element and its length, it is possible to reduce the voltage occurring across any dry band to a value that is insufficient to form a stable arc, and to reduce the current that can flow through any arc to a value that is insufficient to sustain it. In practice, the element will have a length of at least 20 m, preferably at least 40 m, but not more than 100 m, and especially not more than 60 m.

When the resistive elements have a length of this order of magnitude, they will each extend along the cable over a significant fraction of the span of the cable, for example from 10 to 30% of the span, but will not extend over the mid-span part of the cable.

Because optical cables tend to have a lower modulus and weight than that of the phase conductor they tend to be displaced laterally to a greater extent than the phase conductors in high winds and so can move into regions of high electric fields. If the cable is provided with a conductor, or semiconductor along its entire length, its potential will differ substantially from that of the phase conductors throughout its entire span between towers, with the result that corona discharge may occur during high winds. There is even the possibility that the cable may become so close to the phase conductor that flashover between the phase conductor and the cable may occur which can trip out the power supply.

However, because the mid-span region of the cable is dielectric in the system according to the invention, and so its induced voltage is allowed to rise toward that of the phase conductors, the occurrence of corona discharge at the mid-span region of the cable is reduced. Also, any clashing of the cable with any phase conductors in the mid-span region will not produce damaging currents.

The resistive element should have a linear conductivity that is significantly greater than the longitudinal conductivity of the optical cable under dry conditions, preferably a conductivity at least 100 times that of the cable, so that any capacitively induced current will be conducted to ground by the resistive element instead of the cable jacket. Normally the element will have a linear resistance of not more than 2 Mohm m$^{-1}$ and more preferably not more than 500 kohms m$^{-1}$, but a linear resistance of at least 200 and especially at least 300 kohms m$^{-1}$.

The resistive element may be foraged from any materials that conventionally are employed to manufacture such semi-conducting articles, for example from carbon loaded plastics materials or carbon loaded non-woven tapes. Advantageously the element is formed from a plastics material that incorporates electrically conductive carbonaceous fibres. Such fibres may be formed by partial pyrolysis of a polymer for example polyacrylonitrile or acrylonitrile copolymers having an acrylonitrile content of at least 85 mole percent and up to 15 mole percent of copolymers (PAN). Such fibres may have a carbon content of 65% to 92%, preferably less than 85% and a nitrogen content in the range of 5 to 20%, preferably 16 to 20%. Carbonaceous fibre tows that are suitable for use in the present invention are commercially available for example from R. K. Technololgies Ltd of Heaton Norris, Stockport, Cheshire, United Kingdom.

According to another aspect, the invention provides a resistive element which can be removably installed on an optical cable that extends freely between, and is supported by, towers of a combined electrical power and optical transmission system, which element includes a plurality of means for supporting the element on the optical cable, that enables sliding of the element along the cable, and has a length and conductivity such that, in use, if a dry band occurs on the cable at the end of the element the potential difference across the band is insufficient to form an arc, and/or such that the induced current is insufficient to sustain any arc that may occur across the dry band.

BRIEF DESCRIPTION OF THE DRAWINGS

One form of transmission system according to the invention will now be described by way of example with reference to the accompanying drawings in which.

DETAILED DESCRIPTION OF THE PREFERRED EMBODIMENT

Figure 1:
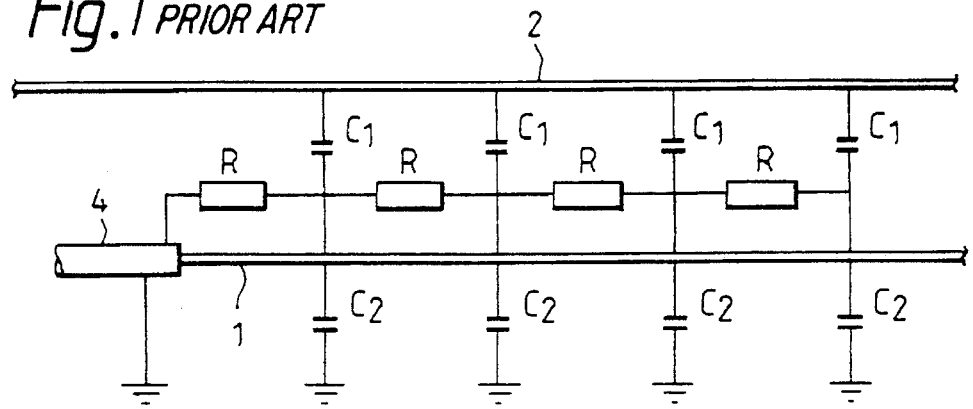
FIG. 1 is a schematic diagram of a conventional all dielectric optical cable and electric power line indicating the distributed capacitances.

Referring to the accompanying drawings, FIG. 1 illustrates a conventional "all dielectric self-supporting" (ADSS) optical cable 1 that is supported between a pair of towers that are also employed to support an electric power cable 2. The ADSS cable 1 is supported at the tower by means of a metallic clamp or fitting 4 which is earthed by means of the tower. In this system there is a distributed capacitance between the optical cable 1 and the phase conductors of which one conductor 2 is shown, indicated by lumped capacitances $C_1$, and a distributed capacitance between the optical cable 1 and ground, indicated by lumped capacitances $C_2$. In addition the cable has a large but finite longitudinal resistance indicated by lumped resistance R.

Figure 2:
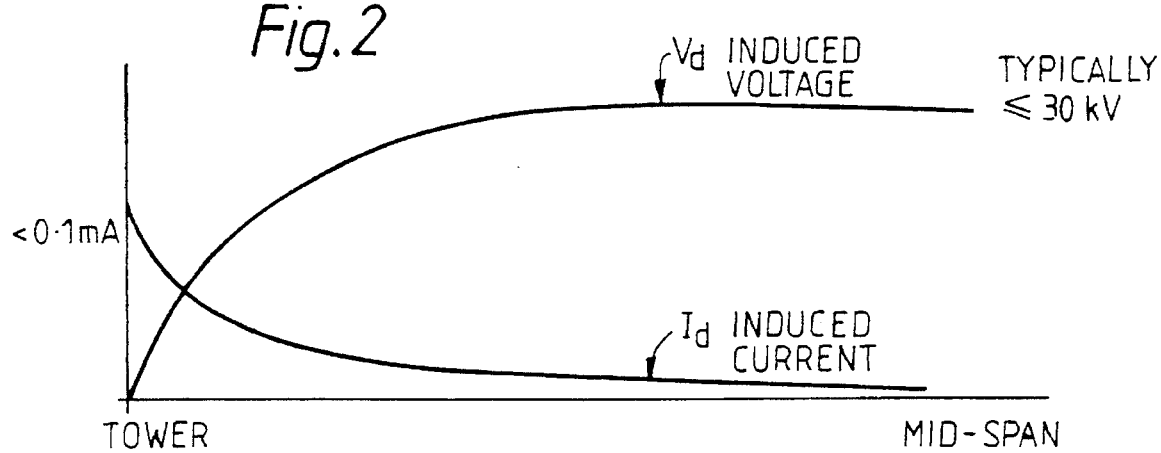
FIG. 2 is a graphical representation of the induced voltage and current on the optical cable in dry conditions.
Figure 3:
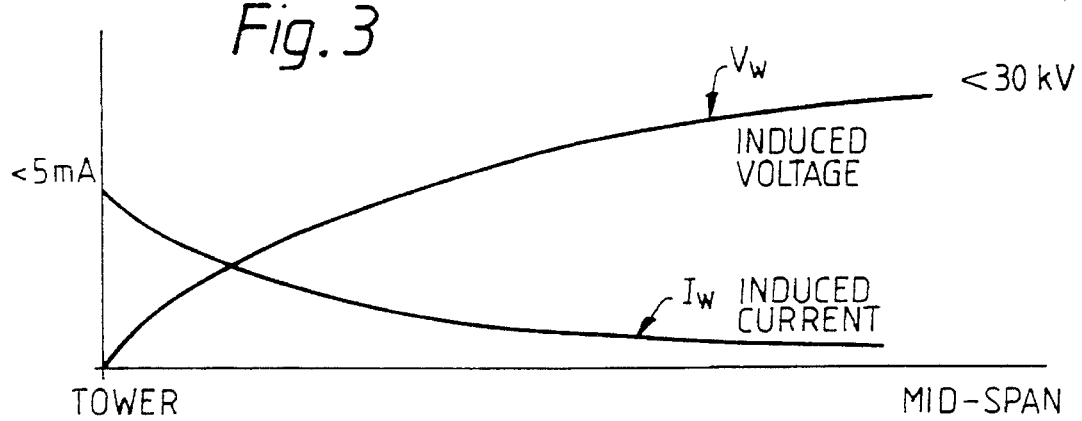
FIG. 3 is a graphical representation of the induced voltage and current on the optical cable in wet conditions with no dry band.

Under dry conditions induced voltages ($V_d$) and currents ($I_d$) occur on the cable as shown in FIG. 2. The induced voltage is highest at mid-span, typically reaching a value of up to 30 kV on a 400 kV line, and is clearly at earth potential at the tower, while the current will be at a maximum at the tower, for example having a value of up to to 100 microamps. Under wet conditions the longitudinal resistance of the optical cable is considerably lower, with the result that the maximum voltage ($V_w$) on the optical cable is lower but the induced current ($I_w$) has risen considerably to a typical value of 0.1 to 10 mA, as shown in FIG. 3.

Figure 4:
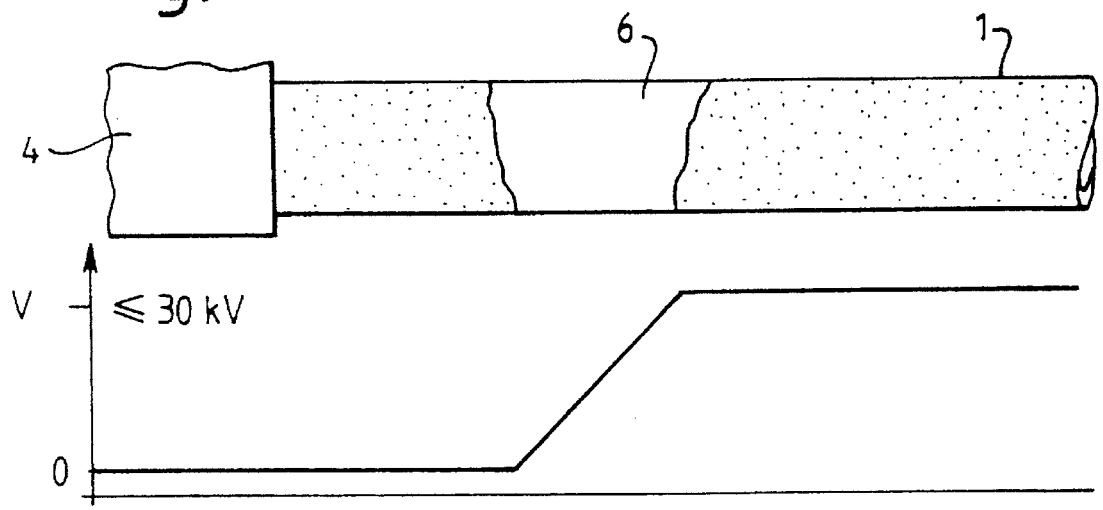
FIG. 4 is a schematic view of a conventional optical cable on which a dry band has formed.

Under these conditions, as shown in FIG. 4, a dry band 6 of typical length 50 mm may form on the cable 1 in the region of the clamp 4 at the tower, due to joule heating of the surface water on the cable. This has the result that almost the entire induced voltage is dropped across this length of cable, and arcing may occur at this point with consequent damage to the cable jacket. If sufficient potential difference exists to strike an arc, this will only be stable if sufficient current is available to maintain the arc (of the order of 0.5 mA).

Figure 5:
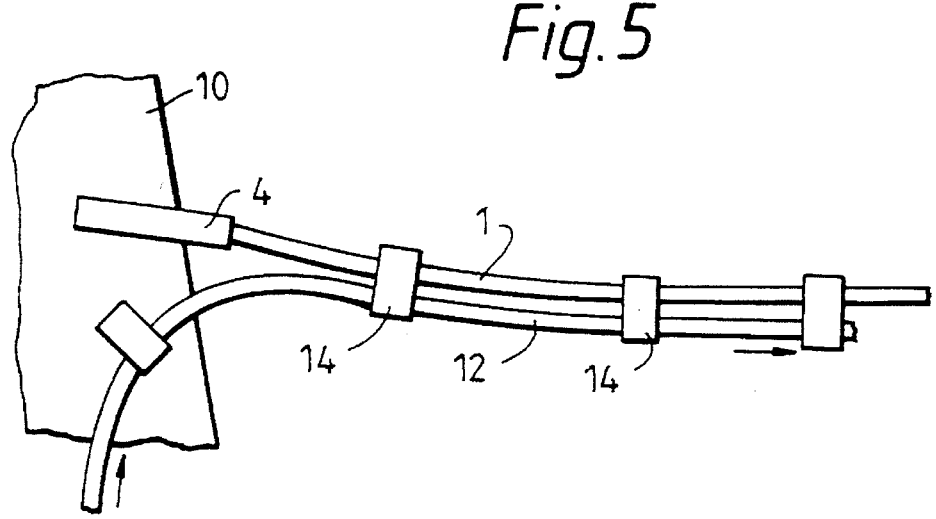
FIG. 5 is a schematic view of part of an optical cable with associated resistive element according to the present invention.

FIG. 5 shows schematically part of a tower 10 of a combined electrical power and optical transmission system according to the present invention which includes an all dielectric optical cable 1 extending from a cable clamp 4 at the tower. A resistive element 12 in the form of a semi-rigid rod that has a number of clips 14 extending along its length in the order of every 400 mm. The rod is passed up the tower 10 in the vertical direction, bent at the tower into a direction parallel to the optical cable 1, and secured to the cable by means of the end clip 14. The rod is sufficiently flexible to allow it to be bent at the tower, but is sufficiently rigid that it can be pushed along the cable from the tower in the direction of the arrow to deploy it fully along the cable. As each of the clips 14 comes into proximity with the cable it is clipped onto the cable and the element pushed further along it. The clips may be electrically conductive or semiconductive, or even electrically insulating since the element 12 will capacitively couple to the optical cable 1 to a much greater extent than to the phase conductors in view of the proximity of the element and the cable. When the element 12 is deployed to its full extent it is connected to the cable clamp 4 in order to ground the proximal end thereof. In order to remove the resistive element, the steps are simply reversed.

As the element is fed into the span a current will flow to earth along its length. For this reason it is desirable to provide an earth path between the element and ground located at a point on the element in the region of the tower but beyond which installation personnel located in the tower will not touch.

Figure 6:
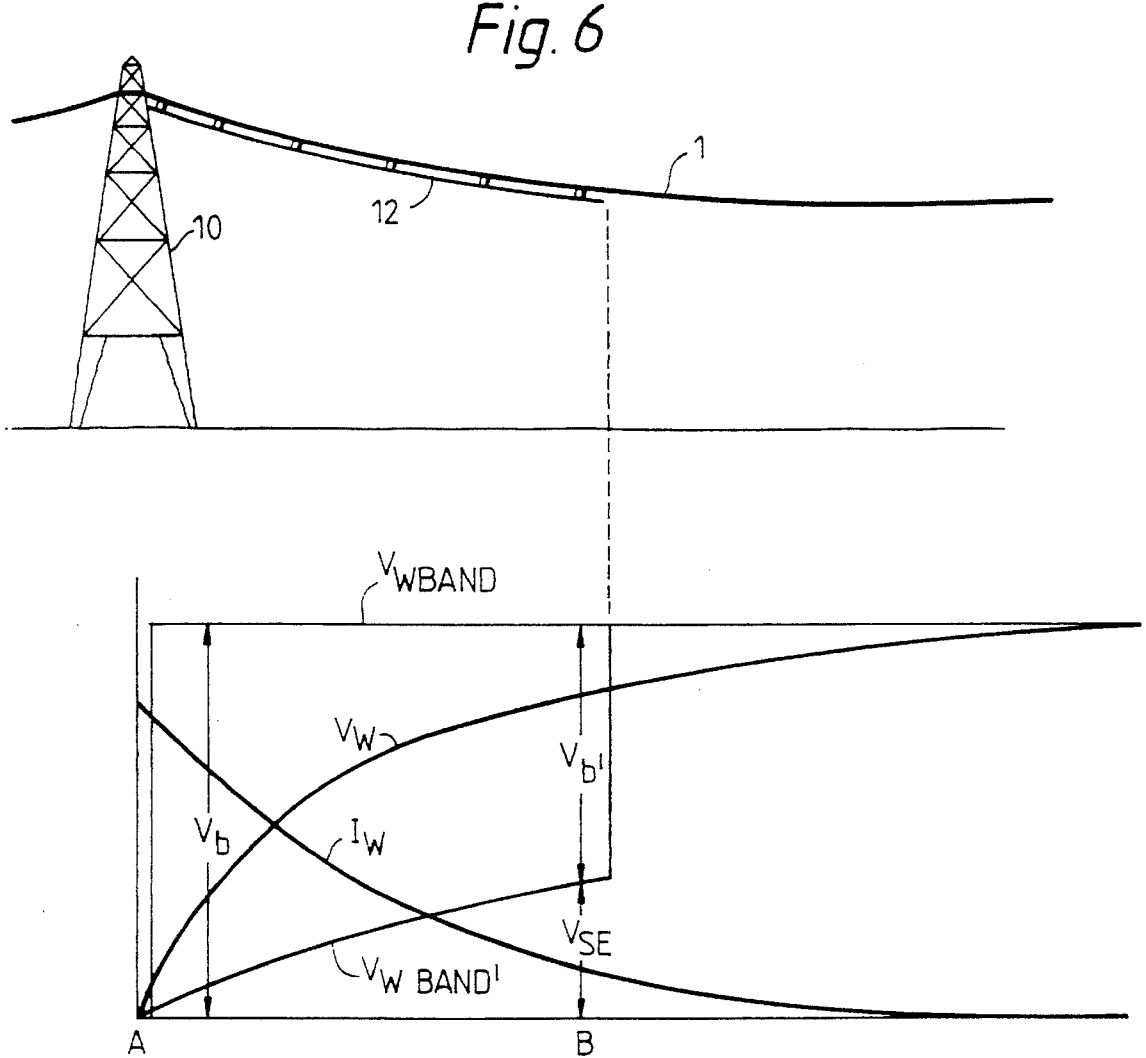
FIG. 6 shows the induced currents and voltages in the system according to the invention.

FIG. 6 shows schematically a tower 10 of the system and that part of an optical cable 1 extending from the tower to the mid point of the span. Other elements of the system such as the phase conductors of the system have been omitted for the sake of clarity. In addition, the capacitively induced voltages and currents are shown graphically on the same horizontal scale, both for the system according to the invention and for a conventional system.

In wet conditions the induced voltage $V_w$ falls, and the induced current $I_w$ increases toward the tower in the same way as shown in FIG. 3, which causes joule heating and dry-band formation at the part of the cable adjacent to the tower in the conventional system (point A). As soon as a dry band is formed, the entire induced voltage $V_b$ is dropped across the dry band so that the induced voltage has the form $V_{w\ band}$, with the result that an arc can be formed. As soon as an arc is formed the voltage distribution returns to the curve $V_w$, and the arc is sustained by the relatively high value of the induced current (curve $I_w$) at point A.

In the system according to the present invention under wet conditions the induced voltage and current will have the same form ($V_w$ and $I_w$). If a dry band is formed on the part of the cable adjacent to the tower, the resistive element will limit the voltage drop across the dry band to a value well below that required for arc formation (1 mA through 500 kohms m$^{-1}$ giving only 25V across 50 mm). However, a dry band may still form beyond the end of the resistive element (point B), whereupon the induced voltage distribution will change to that shown by curve $V_{w\ band}$. In this case the voltage $V_b'$ that is dropped across that part of the band beyond the end of the resistive element, is significantly smaller than $V_b$ due to the fact that the voltage at the end of the resistive element, $V_{SE}$, has risen significantly (for example by 10 kV) due partly to capacitive coupling between the resistive element and the phase conductors and partly to the induced current flowing through the resistive element. Not only is the voltage drop across that part of the dry band beyond the end of the resistive element reduced, but also the induced current $I_w$ at point B is significantly lower than at point A, with the result that an arc cannot be sustained. If the resistance per unit length of the element is suitably chosen then joule heating can be avoided. For example 500 kohms m$^{-1}$ and 1 mA yields a power of 0.5W m$^{-1}$ which is insufficient to warm the element or the moisture on the cable. Thus, formation of a single dry band through positive feedback, by its resistance increasing as it dries out is also avoided. This is an additional benefit of the invention.

The fact that the element is separate from the cable, and not trader the cable sheath, increases its ability to dissipate heat. This reduces the effect of Joule heating and allows greater currents to be dram without detrimental effects of heating.

In a typical 400 kV power distribution system using an L6 tower with circuits with phase arranged symmetrically ABCABC in the place normally preferred for hanging ADSS cables, midway between the bottom four phase conductors, the ADSS cable may have 35 kV imposed at mid-span, which is available for dry-band arc formation. In conditions where the pollution is such that the surface resistance of the cable is 500 kohm m$^{-1}$ an induced current of 2.5 mA may flow, enough to allow the formation of a stable dry-band arc and cause cable degradation. If, however, the system includes a 50 meter long resistive element of linear resistance 300 kohm m$^{-1}$ according to the invention, the voltage ($V_b'$) available for dry-band arcing at the end of the element is reduced to 19 kV and the current to 0.8 mA. If the linear resistance of the element is 400 kohm m$^{-1}$, the voltage drop $V_b'$ becomes 16 kV and the induced current is 0.6 mA, while if the linear resistance of the element is 500 kohm m$^{-1}$, the voltage drop $V_b'$ becomes 13 kV and the induced current is 0.5 mA.

We claim:

1. A combined overhead electrical power and optical transmission system, comprising: electrical phase conductors extending between and supported by towers, and at least one optical cable extending between and supported by the towers, each optical cable having a resistive element removably supported thereby which extends from a tower where it is earthed part of the way along the span of the optical cable, the resistive element having a length and conductivity, whereby for any dry band occurring on the cable at the end of the element, the potential difference across said dry band is insufficient to form an arc and/or if an arc does form, the induced current at the point of the arc is reduced to a value that is insufficient to sustain an arc across said dry band.

2. A system as claimed in claim 1, wherein the resistive element has a sufficient length that, when a dry band is about to form on the optical cable beyond the end of said resistive element, the voltage at the end of the element is raised sufficiently to prevent formation of an arc.

3. A system as claimed in claim 1, wherein the resistive element has a length of at least 20 m.

4. A system as claimed in claim 3, wherein the resistive element has a length of at least 30 m.

5. A system as claimed in claim 1, wherein the resistive element has a length of not more than 60 m.

6. A system as claimed in claim 1, wherein the resistive element can be installed on the optical cable by locating one end of the element on the cable and sliding the element along the cable from the tower.

7. A system as claimed in claim 6, wherein the resistive element includes a plurality of means for supporting the element on the cable, which means enable sliding of the element along the cable.

8. A system as claimed in claim 1, wherein the resistive element has a linear resistance that is less than the linear resistance of the optical cable in wet conditions.

9. A system as claimed in claim 1, wherein the resistive element has a linear resistance in the range of from 200 kohms m$^{-1}$ to 10 Mohm m$^{-1}$.

10. A system as claimed in claim 9, wherein the linear resistance of the resistive element is in the range of from 300 to 500 kohms m$^{-1}$.

11. A resistive element removably installed on an optical cable that extends freely between, and is supported by, towers of a combined electrical power and optical transmission system, which elements includes a plurality of means for supporting the element on the optical cable, that enable sliding of the element along the cable, and has a length and conductivity, whereby for any dry band occurring at the end of said element, the potential difference across said dry band is insufficient to form an arc and/or if an arc does form, the induced current at the point of the arc is reduced to a value that is insufficient to sustain an arc across said dry band.

* * * * *